July 27, 1926.
E. J. SWEETLAND
1,594,334
METHOD OF PREVENTING WEAR OF THE MOVING PARTS OF AN AUTOMOTIVE
INTERNAL COMBUSTION ENGINE
Filed Jan. 10, 1922
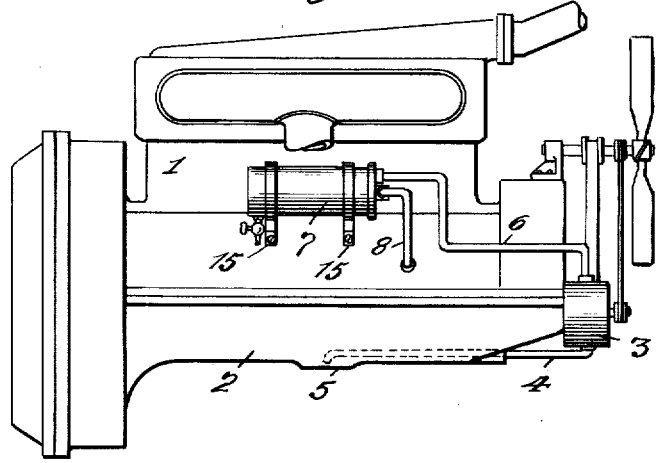
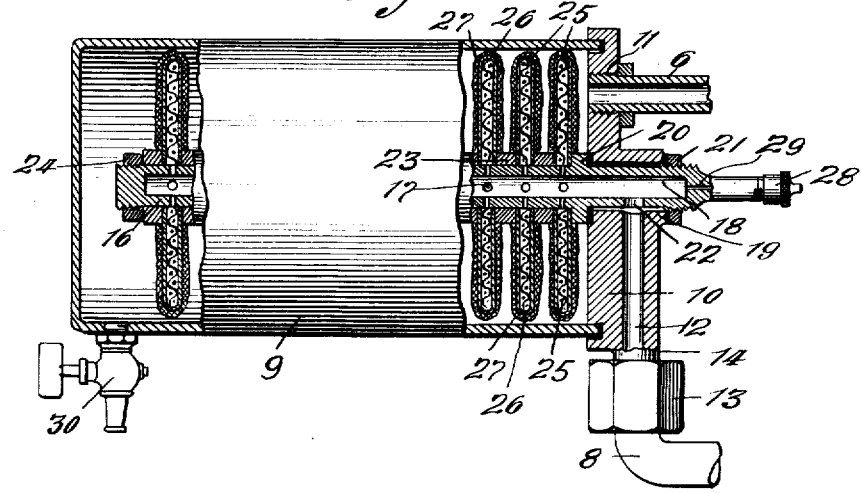
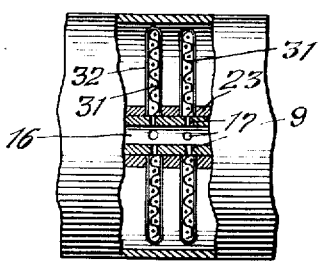
Ernest J. Sweetland, INVENTOR
BY Moses, Hammond, Morse & Nolte
ATTORNEYS Patented July 27, 1926.

1,594,334

UNITED STATES PATENT OFFICE.

ERNEST J. SWEETLAND, OF HAZLETON, PENNSYLVANIA.

METHOD OF PREVENTING WEAR OF THE MOVING PARTS OF AN AUTOMOTIVE INTERNAL-COMBUSTION ENGINE.

Application filed January 10, 1922. Serial No. 528,354.

The present invention is a continuation in part of an application heretofore filed by me on the 3d day of July, 1920, bearing Serial No. 393,807.

The method forming the subject-matter of my present application comprehends the preservation of moving parts of automotive internal combustion engines by preventing wear due to the abrasive action of deleterious substances usually formed in or carried by the lubricating oil. This is accomplished by maintaining at all times a film of clean clear lubricating oil between such moving parts, which in turn can be only accomplished by separating from the lubricant all such deleterious matter, including finely divided particles of carbon and other matter which discolor the oil and are abrasive in character and which cause wearing of the moving parts. This separation is accomplished by continuously circulating the lubricant through a specially constructed filter bed which is capable of arresting and separating this foreign matter from the oil as it is passed under pressure therethrough. The process is carried on continuously during the operation of the engine, and the separation therefore is as a consequence substantially coincident with and at the same rate as the formation or creation of the foreign matter due to combustion or other causes. In this manner, the lubricant in the lubricating system of the engine is maintained free and clear of all abrasive matter which if forced to the bearings would destroy the character of the oil film and cause wear and deterioration of those parts.

In résumé:—By maintaining a clear lubricant in the lubricating system of an engine, frequent changing of the oil is avoided, since the lubricating value or "life" of the oil is materially prolonged, the bearings are maintained in a highly efficient condition due to absence of wear, (and as a consequence it is not necessary to take up such bearings to compensate for wear which would other-wise be present); and finally a conservation of lubricating oil is effected as it becomes only necessary to add oil to compensate for any diminution thereof that takes place through use.

In the accompanying drawings, forming part of this specification,

Figure 1 is a side elevation of an internal combustion engine showing the application of one form of apparatus by means of which my new method may be practiced;

Figure 2 is a vertical longitudinal sectional view of the filter or separating device used, the assembly shown in Figure 1; and Figure 3 is a fragmentary sectional view of a modified form of filter or separating device.

I will now proceed to describe a preferable construction of apparatus which I have found satisfactory for the carrying out of my method of maintaining a substantially clear lubricant in the lubricating system of an engine.

Referring to the drawings, 1 represents an internal combustion engine of any suitable type having a crank case 2, which contains the oil for lubricating the coacting moving parts of the engine, either by the "splash" system or by the forced feed system, as the case may be. Mounted upon the engine, or upon the vehicle frame, is a pump 3, of any approved type provided with an intake pipe 4, extending within the crank case 2 and having its open end positioned adjacent the bottom of the crank case, preferably within a depression 5 formed in the bottom wall thereof. The pump is provided with an outflow pipe 6 leading to a filter 7 from which the filtered oil is conducted to the crank case by a pipe 8.

The filter 7 which may be of any suitable construction is shown for purposes of illustration as comprising a casing 9 provided with a removable cover 10 provided with a threaded opening 11, adapted to receive the threaded end of the pipe 6, and with a passage 12 adapted to communicate with the pipe 8 connected to the cover in any suitable manner, as by a coupling 13 screwed upon the end of the pipe 8 and upon a nipple 14 formed on the cover. The filter is preferably carried by the engine, being secured in position by means of straps 15, as shown in Figure 1. Positioned within the casing 9 and extending axially with respect thereto throughout substantially its length, is a tubular member 16 having a closed inner end and provided with perforations 17 in its wall communicating with the bore 18. The other end of the tubular member extends through an opening 19 formed in the cover 10 and is provided with a shoulder 20 adapted to engage the inner wall of the cover. Adjacent its extreme outer end the tubular member is provided with a thread adapted to receive a nut 21 which engages the cover 10 and, together with the shoulder 20, serves to support the tubular member upon the cover. An opening 22 formed in the wall of the tubular member registers with the inner end of the passage 12 whereby the bore 18 of the tube is in communication with the pipe 8 which leads from the filter to the crank case.

Mounted upon the tubular member 16 are a plurality of annular filter elements spaced from one another by annular spacing members 23, preferably formed of felt or the like, the filter elements and spacing members being securely held in assembled position upon the tubular member by means of a nut 24 threaded upon the inner end thereof. As shown in Figure 2, each filter element consists of an annular member 25, formed of coarse wire netting, reticulated metal, or the like, enclosed by fine wire screening 26, whereby the filter elements are provided with chambers which communciate with the perforations 17 in the tubular member 16.

The exposed surfaces of the wire screening 26 of each of the filter elements are provided with a coating 27, shown of exaggerated thickness in Figure 2, having the property of preventing the passage therethrough of the fine particles of carbon and other foreign matter which may be suspended within the oil to be filtered, while permitting the clear filtered oil to pass therethrough. This coating consists of a slime bed formed of an insoluble substance and the impurities filtered out of the oil. The insoluble substance is preferably flocculent in nature and one which will form a permeable bed of extremely fine texture. Such substances as kieselghur, fuller's earth, charcoal, carbonate of lime, asbestos in flake or fibre form wood pulp, or any other suitable substance which will serve to combine with the suspended deleterious matter in the oil to form a slime bed will serve the purpose of forming a coating to a sustaining screen or other perforated support. A filter bed so formed is capable of arresting and resisting the passage of small carbon particles, so fine that the oil delivered from the filter is visibly clear and free from cloudiness and contains no solid particles of large enough size to cause abrasion or wear on the bearings.

The insoluble substance may be deposited upon the wire screening in any suitable way. For example, it may be mixed with a vehicle consisting of a liquid or viscous substance and the mixture applied to the screening whereby the insoluble substance will adhere thereto, or if desired, the substance, either by itself or mixed with a liquid or viscous substance, may be placed directly within the crank case or within the filter casing, and as the oil to be filtered is caused to circulate the insoluble substance will be carried thereby into engagement with the screening and deposited thereupon. Moreover, the insoluble substance may be applied to the screening either before or after its being formed into filter elements. The insoluble substance, when deposited upon the screening, serves to collect the finely divided suspended particles from the oil and to form therewith a slime bed which effectually prevents the passage of any suspended impurities of a size sufficient to cause abrasion of the lubricated parts; but permits the passage of the clear filtered oil.

As shown in Figure 2, a valve 28 of the type used in connection with automobile tires and the like, is mounted upon the outer end of the tubular member 16 and communicates with the bore 18 by means of a passage 29. Upon connecting this valve with a suitable air pump, such as the air pump usually carried by motor vehicles, air may be blown into the bore 18 of the tubular member 16 and through the several filter elements, in the reverse direction from the flow of oil through the filter, and this air will tend to remove the slime bed from the filter elements when cleaning of the same is necessary or desirable. The air thus forced into the filter casing escapes through a suitable normally closed petcock 30 communicating with the interior of the filter casing.

During the operation of the engine, the pump 3, which may be the ordinary oil pump on the engine, will withdraw oil from the crank case 2 through the pipe 4 and force it through the pipe 6 into the casing 9 of the filter 7, and into contact with the several filter elements mounted upon the tubular member 16. The deleterious matter which may be suspended in the oil, including the extremely fine carbon particles, cannot pass through the slime bed 27 and will therefore be extracted from the oil, and the clear oil, free from all impurities, will be forced through the slime bed 27 and wire screening 26 into the chambers within the filter elements, from which it passes through the perforations 17 in the tubular member 16 into the bore 18 thereof. From the bore 18, the clear oil flows through the opening 22 and passage 12 into the pipe 8 which conducts it back to the crank case 2.

Referring to Figure 3, there is shown a filter, the filter elements of which differ slightly in construction from the ones shown in Figure 2. In the modified form, each filter element consists of an annular member 31 formed of wire netting reticulated metal or the like enclosed by a close-woven cloth fabric 32, such as duck, canvas, chain-cloth or the like, having an extremely fine mesh which will serve to collect the finest particles suspended in the oil to be filtered. In use, at the commencement of the filtering operation, a portion of the fine suspended particles will pass through the fabric 32, but within a short time the impurities collected thereon will serve to prevent the passage therethrough of any of the fine particles with the result that only the clear oil freed from all abrasive suspended matter will pass through the fabric.

It is, of course, understood that a coating or slime bed, as above described, may be formed in any suitable manner upon the non-metallic fabric 32 is desired, altho I have found that such fabric without the coating will operate in a satisfactory manner. The finely woven non-metallic fabric of the filter having such an extensive area within a small compass makes a very satisfactory filter for the purpose and I have found that it serves to produce a filter bed which is capable of arresting the very minute and finely divided particles of solid matter that are present in the used oil. Owing to the extensiveness in area of the filter surface, the filter device of my construction functions for a considerable period of time without necessitating cleaning. In fact, a filter constructed in the manner just described, has shown satisfactory results after hundreds of miles of running without becoming clogged to such an extent as to require cleaning. The fabric may be provided with strands of wire to increase its strength, if desired.

Although the passage of the filtered oil through the fabric of each filter element in my method is retarded by the slime bed and the impurities which are collected thereby, the required flow of filtered oil through the filter is obtained by reason of the extensive filtering surface which is provided by the combined filtering surfaces of the several filter elements and as the oil is under pressure, this is also true of the filter construction in Figure 2.

While I have described my filtrate as visibly clear, it will be understood that the complete removal of microscopic solids from the oil is not the desideratum of my invention, but rather the removal of solid particles of a character to cause a break in the oil films between the bearings or to cause abrasion of the wearing surfaces, said removal to be effected at a rate substantially equal to or in excess of the rate of accumulation of said deleterious solids.

While I have illustrated certain specific apparatus for the practicing of my method of maintaining clear oil in the lubricating system of an internal combustion engine, I am intending by the following claims to cover the principles of said invention in whatever form they may be specifically embodied or practiced.

Having thus described my invention, I claim:

1. The method of preventing the accumulation of solid particles in the oil in the lubricating system of an automotive internal combustion engine, normally containing a substantially constant volume of oil which comprises providing a filter casing of a size small enough to be carried beneath the hood, on an automobile, providing a filter surface therein of a density to remove the deleterious solids from the oil passing therethrough and of an effective area substantially in excess of prior practice, and correlating the size of the filter area in said casing to the volume of oil in the system and the oil pressure and rate of oil flow from the engine oil pump, so that the oil content of the system may be circulated through said filter under normal engine operation with sufficient frequency to remove the solid particles substantially at the rate they appear in the oil.

2. The method of preventing the accumulation of solid particles in the oil in the lubricating system of an automotive internal combustion engine, normally containing a substantially constant volume of oil, which comprises providing a filter casing of sufficiently small size to be carried beneath the hood, on an automobile, providing a filter surface therein of a density to remove deleterious solids from the oil passing therethrough and of an effective area substantially in excess of prior practice, and correlating the size and density of the filter area in said casing to the volume of oil in the system, the oil pressure, the rate of oil flow through said system, and the quantity of deleterious solids to be removed, to so control the rate of deposition of said solid particles upon the filter surface that the oil content of said lubricating system may be circulated through said filter under normal engine operation, for a period, equivalent to several hundreds of miles of running, before the deposition of solid particles on the filter surface is sufficient to reduce the flow of oil therethrough, below the frequency necessary to prevent the accumulation of deleterious solids in oil in said lubricating system.

3. In a lubricating system for an automotive engine containing a body of oil exposed to contamination by deleterious solids, means to circulate the oil to the parts to be lubricated, and to a filter casing, and a fine texture filter in said casing having an area and capacity so correlated to the size of the system and the contaminating conditions under which the system is used as to remove said deleterious solids at a rate substantially equal to the rate of contamination of said oil by said deleterious solids.

In testimony whereof I have affixed my signature to this specification.

ERNEST J. SWEETLAND.

motive engine containing a body of oil exposed to contamination by deleterious solids, means to circulate the oil to the parts to be lubricated, and to a filter casing, and a fine texture filter in said casing having an area and capacity so correlated to the size of the system and the contaminating conditions under which the system is used as to remove said deleterious solids at a rate substantially equal to the rate of contamination of said oil by said deleterious solids.

In testimony whereof I have affixed my signature to this specification.

ERNEST J. SWEETLAND.

DISCLAIMER 1,594,334.—*Ernest J. Sweetland*, Hazleton, Pa. METHOD OF PREVENTING WEAR OF THE MOVING PARTS OF AN AUTOMOTIVE INTERNAL-COMBUSTION ENGINE. Patent dated July 27, 1926. Disclaimer filed Feb. 29, 1932, by the patentee, and the sole licensee *Motor Improvements, Inc.*

Hereby make disclaimer from claim 3 of said Letters Patent No. 1,594,334 of any lubricating system except where the fine texture filter has an extensive area within a small compass and is adapted and arranged to carry out the method set forth in the said patent substantially as and for the purposes therein described.

[*Official Gazette March 22, 1932.*]

DISCLAIMER 1,594,334.—*Ernest J. Sweetland*, Hazleton, Pa. METHOD OF PREVENTING WEAR OF THE MOVING PARTS OF AN AUTOMOTIVE INTERNAL-COMBUSTION ENGINE. Patent dated July 27, 1926. Disclaimer filed Feb. 29, 1932, by the patentee, and the sole licensee *Motor Improvements, Inc.*

Hereby make disclaimer from claim 3 of said Letters Patent No. 1,594,334 of any lubricating system except where the fine texture filter has an extensive area within a small compass and is adapted and arranged to carry out the method set forth in the said patent substantially as and for the purposes therein described.

[*Official Gazette March 22, 1932.*]